United States Patent
Lauri et al.

(10) Patent No.: US 9,514,403 B2
(45) Date of Patent: Dec. 6, 2016

(54) SMART CARD WITH A SECURITY ELEMENT DIVIDED BETWEEN CARD BODY AND MODULE

(71) Applicant: SMART PACKAGING SOLUTIONS, Rousset (FR)

(72) Inventors: Philippe Lauri, Marseilles (FR); Philippe Patrice, Marseilles (FR); Ivan Peytavin, Aix en Provence (FR)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 14/758,763

(22) PCT Filed: Nov. 15, 2013

(86) PCT No.: PCT/FR2013/000296
§ 371 (c)(1),
(2) Date: Jun. 30, 2015

(87) PCT Pub. No.: WO2014/102461
PCT Pub. Date: Jul. 3, 2014

(65) Prior Publication Data
US 2015/0356400 A1    Dec. 10, 2015

(30) Foreign Application Priority Data

Dec. 31, 2012  (FR) .................... 12 03628

(51) Int. Cl.
*G06K 19/18*  (2006.01)
*G06K 19/077*  (2006.01)
(Continued)

(52) U.S. Cl.
CPC ........... *G06K 19/18* (2013.01); *G06K 19/0772* (2013.01); *G06K 19/07779* (2013.01); *G06K 19/08* (2013.01); *G06K 19/083* (2013.01); *G06K 19/10* (2013.01)

(58) Field of Classification Search
CPC ............... G06K 19/0772; G06K 19/07779; G06K 19/08; G06K 19/083; G06K 19/10; G06K 19/18
USPC ......................... 235/379, 491, 492
See application file for complete search history.

(56) References Cited

U.S. PATENT DOCUMENTS

| 5,552,574 A | 9/1996 | Merlin et al. |
| 6,259,035 B1 | 7/2001 | Truggelmann et al. |

(Continued)

FOREIGN PATENT DOCUMENTS

| DE | 196 25 466 C1 | 11/1997 |
| DE | 10 2005 048 033 A1 | 4/2007 |

(Continued)

OTHER PUBLICATIONS

International Search Report (PCT/ISA/210) mailed on Feb. 26, 2014 by the European Patent Office as the International Searching Authority for International Application No. PCT/FR2013/000296.
(Continued)

*Primary Examiner* — Seung Lee
(74) *Attorney, Agent, or Firm* — Buchanan Ingersoll & Rooney PC

(57) ABSTRACT

The invention concerns a smart card comprising a card body provided with a cavity in which an electronic module incorporating a microelectronic chip is inserted, and at least one security marking designed to authenticate a component of the smart card. A first security marking is disposed on the microelectronic module, and a second security marking is disposed on the card body. The two security markings are linked by a visual identity or matching relationship indicating that the microelectronic module and the card body are original components assembled when the smart card was manufactured.

20 Claims, 3 Drawing Sheets

(51) Int. Cl.
*G06K 19/08* (2006.01)
*G06K 19/10* (2006.01)

(56) References Cited

U.S. PATENT DOCUMENTS

| | | | |
|---|---|---|---|
| 8,314,828 B2* | 11/2012 | Bombay | B41M 5/26 347/225 |
| 9,117,153 B2* | 8/2015 | Launay | G06K 19/073 |
| 2005/0211785 A1 | 9/2005 | Ferber et al. | |
| 2011/0163167 A1 | 7/2011 | Artigue et al. | |
| 2013/0008968 A1 | 1/2013 | Launay et al. | |
| 2014/0263624 A1* | 9/2014 | Guillaud | G06K 5/00 235/380 |

FOREIGN PATENT DOCUMENTS

| | | |
|---|---|---|
| EP | 2 533 175 A1 | 12/2012 |
| JP | 2004-341759 A1 | 12/2004 |
| WO | WO 2009/153464 A1 | 12/2009 |

OTHER PUBLICATIONS

Written Opinion (PCT/ISA/237) mailed on Feb. 26, 2014 by the European Patent Office as the International Searching Authority for International Application No. PCT/FR2013/000296 (with English language translation, 5 pages).

* cited by examiner

SMART CARD WITH A SECURITY ELEMENT DIVIDED BETWEEN CARD BODY AND MODULE

The invention relates to smart cards comprising a visible electronic module, especially contact or contactless smart cards, such as, by way of nonlimiting example, the smart cards used in banking applications or in identification applications.

The invention is independent of the size of the smart card, and is applicable both to conventional smart cards and to other secure documents provided with a visible electronic module and thus, to simplify the description, the expression "smart cards" is used to designate both smart cards of conventional format (according to standard ISO 7816-1) and other types of formats.

The invention is therefore applicable both to contact smart cards (capable of communicating with a smart card reader using the contact terminals of the smart card) and to contactless smart cards capable of interacting with a card reader without contact by virtue of a radiofrequency communication), provided that said cards are provided with a visible electronic module. The invention is also applicable to contact and contactless hybrid smart cards. A recurrent problem with smart cards comprising visible modules is fraud perpetrated by extracting the module and transferring it to another card, in order thus to form a counterfeit smart card.

PRIOR ART

A number of different types of security documents or cards comprising an electronic chip are already known from the prior art.

Thus, identity cards having a contact smart card format are known in which the electronic module is "embedded", i.e. fastened in a cavity of the card body, so that the electrical contacts of the module remain accessible on the surface of the card so as to allow the module to be connected to a contact card reader. The problem with this type of identity card is that it remains possible to access the contacts or even purely and simply to replace the electronic module, for the purpose of identity fraud.

In order to partially solve this problem, document DE 196 25 466 C1 describes a contact smart card the contacts of which are themselves provided with a graphic, especially of a specific color different from the conventional gold or silver color. For this purpose, the contacts are coated with a metal spreading layer containing colored particles based on aluminum. However, the contacts remain electrically accessible, thereby making it possible to perpetrate fraud by attacking the circuit of the chip via the contacts of the smart card. Furthermore, the contacts and the module also remain physically accessible, thereby again making it possible to envision removing or even replacing the electronic module.

A contact smart card in which it has been sought to make the electronic module and the metal contacts as discreet as possible in appearance by coloring the contacts themselves so that the graphic on the surface of the module is an extension of the graphic of the card body is also known from document U.S. Pat. No. 6,259,035 B1. This method is not a satisfactory defense against the aforementioned problem of extraction of the module.

An opposite approach has also been pursued in U.S. Pat. No. 5,552,574, which in contrast describes a way of providing the surface of the contacts of a contact smart card with a security engraving, produced using a laser beam. However, the laser engraving of the metal contacts of the module degrades the metalizations, leading microoxidations to form that are liable eventually to have a detrimental effect on the correct electrical operation of the contacts and therefore of the smart card.

A credit card comprising a magnetic strip is also known from document US 2005/0211785 A1, the card body of the credit card comprising one or more alphanumeric characters located in part above a processor integrated into the card body. In this type of card, the alphanumeric characters play no role in authentication of the credit card since the latter moreover comprises a keyboard for entering a security code to the processor, which implements an algorithm for checking the code entered. The security feature provided by this arrangement is therefore a software security feature based on a code. In particular, a simple visual examination of the card does not allow it to be authenticated.

A contact smart card provided with a module having standardized metalized contacts is furthermore known from document U.S. Pat. No. 6,259,035 B1. In order to improve the visual appearance of the smart card, and in particular to eliminate the visual discontinuity between the surface of the card body and the surface of the module, the same visual content is printed on the surface of the module and on the surface of the card body.

Moreover, from document DE 10 2005 048033 A1, a smart card is also known the card body of which comprises a feature using conductive lines printed using a piece of coding software, so that said feature has unique electromagnetic properties. These electromagnetic properties are moreover encoded into the memory of the smart card. It is clear that only recourse to a step of reading memory data, followed by a step of comparing the read data with the electromagnetic response of the feature, makes it possible to indicate whether it is a question of a fake card or not. These steps are impossible to implement with a simple visual examination, require hardware, and are not suitable for a rapid visual inspection, as is for example required by smart identity cards.

To summarize, the problem of security markings has mainly been addressed, for the most commonly used type of contact cards, either by guilloches or other graphics produced on the card body, or by a graphical alteration of the metal contacts of the module, i.e. coloring of the contacts or laser engraving produced directly therein.

Regarding contactless cards, it is recognized that it is preferable, for reasons of manufacturing yield, to use reliable high-yield manufacturing processes (such as the conventional embedding process used for contact cards) consisting in placing a contact module in a cavity of the card. However, as was mentioned above, this process as such is not very secure since the cards thus fabricated are particularly exposed to fraud consisting in extracting the module from the card and reinserting it into another card, this type of fraud being a notable threat, in particular to cards or documents intended for identity authentication applications.

Moreover, certain cards are produced in technologies implementing two communication interfaces and comprise both contactless electronics embedded in the card body and, furthermore, contacts for communication with a contact card reader. This type of card potentially combines the security flaws of both types of cards described above.

AIM OF THE INVENTION

One aim of the present invention is therefore to provide an improvement to security markings for smart cards comprising a visible electronic module, capable of remedying the aforementioned drawbacks.

In particular, one aim of the present invention is to provide a smart card comprising a visible electronic module having an improved security with respect to extraction of the module, and that is easy to manufacture economically with high yields comparable to the manufacturing yields of contact cards, while being compatible with visible security graphics such as logos, security holograms or codes, which are generically referred to as "security markings".

For this purpose, the subject of the invention is a smart card comprising a card body provided with a cavity in which is inserted a microelectronic module incorporating a microelectronic chip, and at least one security marking able to authenticate a component of the smart card, characterized in that it comprises a first security marking distributed between the microelectronic module and the body of the smart card, and at least one second security marking placed on the card body, and in that the first and second security markings are related by an identity relationship or visual complementarity indicating that the microelectronic module and the card body are original components assembled during manufacture of the smart card. Thus, the first security marking serves as a reference for comparison to the second security marking. Of course, the principle of the invention could easily be extended to a number of security markings, especially second security markings, higher than two, distributed between the card body and the microelectronic module.

In this way, the security marking is distributed between the electronic module and the body of the smart card, so that removal of the module alters the correspondence of the two security markings and makes the fraud easily visible or detectable.

The precise location of each of the two markings may vary from one variant embodiment to another, especially depending on the compromise that is required between the discretion of the marking as regards potential fraudsters, and the ease of detection of a counterfeit card by law enforcers or equivalent.

Thus, according to a first variant embodiment, the first and second security markings are produced on the surface of the electronic module and of the card body, and on the surface of the card body, respectively, and are visible to the naked eye, thereby allowing a fraud to be immediately detected, by way of the change in the correspondence between the two markings.

According to another more discreet variant embodiment, one of the two security markings is produced on the surface of the microelectronic module and of the card body and is visible to the naked eye, the other being produced in the structure of the microelectronic module or of the card body and being invisible to the naked eye, but detectable especially by x-ray radiography.

According to another even more discreet variant embodiment, the two security markings are produced in the structure of the microelectronic module and in the structure of the card body during their respective manufacturing or personalization processes, and they are invisible to the naked eye, but detectable especially by x-ray radiography.

According to another advantageous variant of the invention, the security marking of the module is printed on or engraved in the surface of the microelectronic module, and the security marking of the card body is printed on or engraved in an intermediate layer of the card body, and is visible through a transparent window provided in a layer of material covering said intermediate layer. In this way, the security marking of the card body, while remaining visible, is nonetheless particularly well protected against attempted modifications or physical attacks.

According to another positional variant of the security markings, the first security marking is distributed between the module and the card body, and in particular is placed straddling the microelectronic module and the card body, and then comprises a portion produced on the microelectronic module and a portion produced on the card body, and the entirety of the first security marking is furthermore reproduced substantially identically, by way of reference for comparison, in at least one preset location on the card body.

In all the aforementioned cases, the equivalence or complementarity between the one or more security markings of the module and the one or more security markings of the card body attest, with a very high degree of reliability, that the original module is in place in the original card body of the smart card.

According to the invention, the security marking may take a number of forms. It may for example be a question of a hologram. However, according to one very simple embodiment of the invention, the security marking is composed of a sequence of alphanumeric characters. In this case, the alphanumeric characters of the markings may be aligned in a straight line. Alternatively, they may be placed in two straight-line segments making a preset angle to each other. This preset angle may moreover form an additional security element that will be very difficult to copy on a fake card in which it is attempted to place a module extracted from another card.

According to another advantageous embodiment of the invention, each marking or marking portion corresponds to one portion of a digital code, so that the two markings depend on each other via a secret coded relationship. Thus, for example, the security marking may consist of all or some of the serial number of the smart card, or of a code obtained by encrypting the serial number of the smart card.

Contact cards possess an electronic module the metalized and standardized contacts of which are separated by grooves through which the insulating epoxy substrate is exposed. The invention then advantageously provides, for this type of card, for that portion of the security marking which is located on the module not to be engraved on the metalized contacts, but between the contacts, in the zone of the epoxy substrate. This makes it possible to avoid the microoxidations that would result from directly engraving the surface of the metalized contacts.

Contactless cards comprising a visible module most often possess an antenna located on the module and the metal turns of which are visible and separated by inter-turn spaces made of epoxy resin. Here again, the invention advantageously provides for the security marking of the module to be produced on the substrate of the antenna carrier between the metalized turns thereof, even though a marking on the turns of the antenna is also possible.

The above contactless smart card variants may be implemented whatever the contactless communication structure of the card, i.e., for example, the communication antenna may be located directly on the electronic module, or in the card body, and it may also be complemented by a second antenna acting as an amplifier of electromagnetic flux with respect to the first antenna.

Thus, as a first variant, the card body comprises a plurality of layers of material, made of plastic or even paper, and the antenna is produced between two adjacent layers of the card body and comprises contact pads arranged at the bottom of the cavity of the card body and connected to connection terminals of the electronic module.

However, the card may also comprise a second antenna produced in the card body and placed facing the antenna of the module, so as to amplify the electromagnetic flux collected by the antenna of the module.

In another even more secure variant embodiment of the invention, the security markings are encoded in digital form and stored in a memory of the smart card. This allows, at the expense of an additional verification step in which the memory is read, the two security markings to be compared with each other, and with the coded security marking stored in memory, it being understood that any discrepancy could mean that the smart card is not an authentic smart card in the same condition as when it left the factory.

Other features and advantages of the invention will become apparent on reading the detailed description and from the appended drawings in which.

Figure 3:
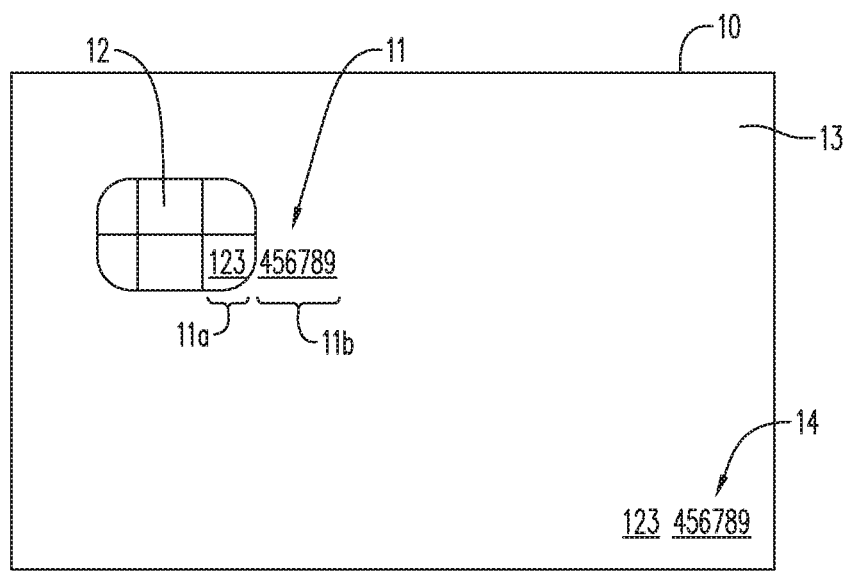
Figure 4:
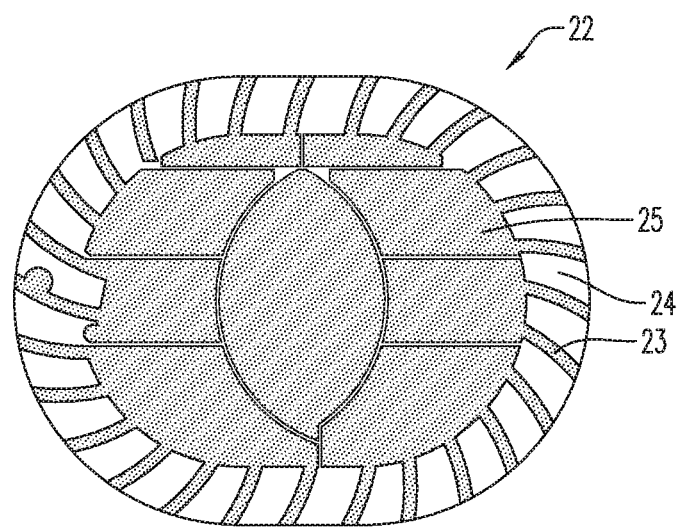
Figure 5A:
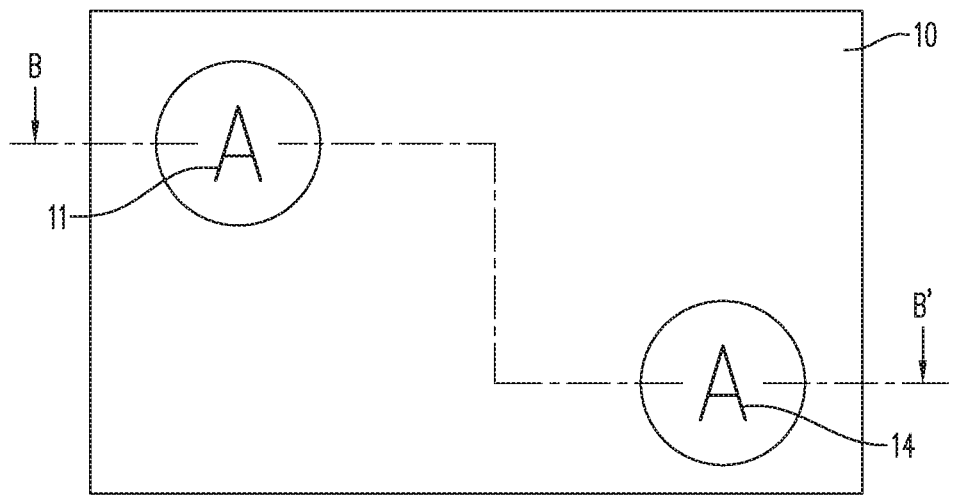
Figure 5B:
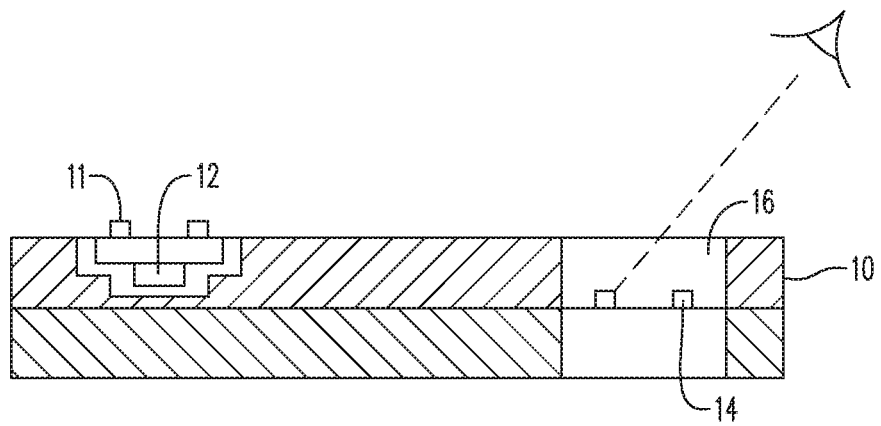

FIG. 3 schematically shows the surface of a smart card according to the invention;

FIG. 4 shows a variant embodiment of a smart card module comprising insulating zones between the metalized contacts, capable of receiving a portion of the security marking according to the invention; and FIGS. 5A and 5B show a plane view and a cross-sectional view along B-B' of a smart card according to the invention, respectively.

Figure 1:
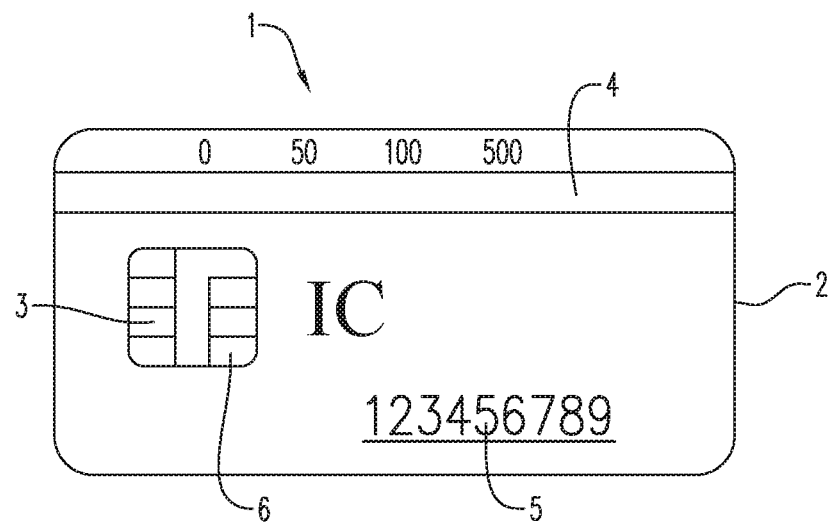
FIG. 1 shows a schematic view of a smart card known from document JP 7314963.

Reference is made to FIG. 1. This figure shows a known smart card, the numerical references are those used in the prior-art document JP 7314963. As may be seen, the smart card 1 comprises a card body 2, and a visible electronic module 3. The card body 2 comprises a marking taking the form of a code 5, and the module 3 comprises a marking 6 integrally located on the surface of the module. Thus, assuming that the two codes are identical, in order to create a counterfeit card a fraudster will merely have to remove the module 3 from the original card, to produce a card body in his name and reproduce the code marked on the module, and place the module in the new card body. These are relatively simple operations that relatively poorly resourced fraudsters would be able to carry out.

Figure 2:
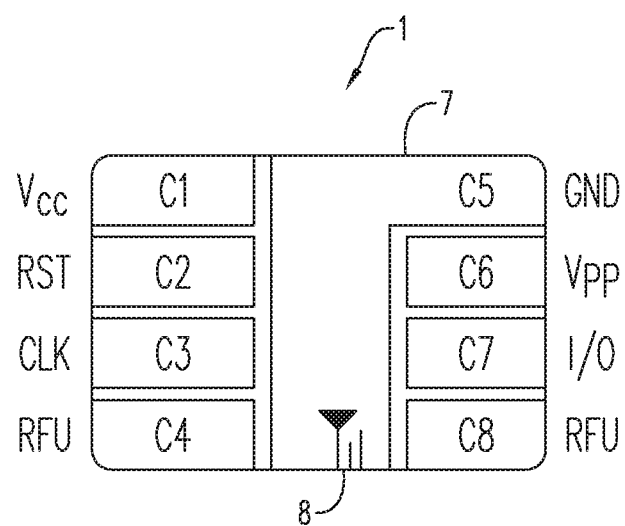
FIG. 2 shows a schematic view of a smart card module known from document JP 2004341759.

FIG. 2 shows a module 7 provided with a security logo 8 entirely located on the surface of the module. Here again, it is easy to produce a counterfeit card simply by placing this module in a card body moreover comprising printings corresponding to its future user.

FIG. 3 schematically shows a smart card 10 according to the invention. This time, a security marking 11, shown by way of example in the form of a 9-figure code 123456789, one portion (11a) of which is engraved in or printed on the surface of the module 12, and another portion (11b) of which is engraved in or printed on the surface of the card body 13, is provided. The security marking 11 (11a, 11b) is therefore placed straddling the visible module of the smart card and the card body. More precisely, in the example shown, the portion 11a of the code made up of the first 3 figures of the security code is located on the module, and the rest of the code (11b) is located on the card body 13. The entirety of the security marking is produced in one go during graphical personalization of the smart card. The entirety of the code is produced with the same personalization tools and under one specific set of conditions. This makes it very difficult to transfer this module to another card body because it would be extremely difficult to reproduce on another card body the missing portion (456789) of the marking with exactly the same size and in exactly the same position.

The original card body 13 preferably comprises a copy 14 of the marking 11 that is moreover distributed between the module and the card body, thereby making it easier to inspect the card with a view to detecting whether it is a question of an original card or a counterfeit card.

FIG. 4 shows a module 22 for a contact and contactless hybrid card. Insulating protuberances 23 may be seen on the periphery of the module, separating metalized zones 24, antenna turns being located under the protuberances on the other side (not shown).

In this particular case, in order to avoid microcorrosion effects due to the engraving of a security marking in the metalized contacts 25, the invention makes provision to engrave by laser that portion 11a of the marking which is located in the module between the metalized contact zones 25 or between the protuberances 23. In the particular case (not shown) in which the antenna turns are located on the same side as the metalized contacts of the module, one portion of the security marking could be engraved in an insulating zone located between the turns of the antenna, or if the materials used allow it, from the point of view of their resistance to corrosion, a security marking could be engraved directly on the antenna.

With reference to FIG. 5, a security marking 14 corresponding to the security marking 11 of the module is placed in the card body 10. The marking 14 of the card body is especially produced by printing on or engraving an intermediate layer of the card body, opposite a transparent window 16 in the card body. Thus, the security marking 14 is visible through the transparent window 16 provided in the layer of material covering said intermediate layer.

ADVANTAGES OF THE INVENTION

The invention achieves the stated aims and provides a smart card comprising graphical security elements distributed between the surface of the module and the surface of the card body, allowing a given module to be paired with a given card body.

The distributed security elements 11a, 11b are produced in one go during the graphical personalization of the smart card, this making it extremely difficult to extract the electronic module from a smart card and then place it in another card body while reproducing a posteriori on this card body the missing graphical security portion.

In the case where the marking is invisible to the naked eye, transfer of a module provided with a marking to a card body without the corresponding marking will be easily detectable by merchants who verify the card under a magnifying glass, no sophisticated inspection tools being required to perform this verification.

As regards fraudsters who are in a position to detect the presence of a factory-produced marking distributed between the card body and the module, the portion of the marking that figures on the card body will be very difficult to reproduce using isolated means because a slight offset, which will nonetheless be visible either to the naked eye or using a magnifying glass, will be produced between the two markings.

The invention claimed is:

1. A smart card comprising:
a card body provided with a cavity in which is inserted an electronic module incorporating a microelectronic chip, and at least one security marking able to authenticate a component of the smart card, wherein the security marking comprises a first security marking distributed between the microelectronic module and the card body, and at least one second security marking placed on the card body, and wherein the first and the one or more second security markings are related by an identity relationship or visual complementarity indicating that the microelectronic module and the card body are original components assembled during manufacture of the smart card, wherein the first security marking is produced on the surface of the microelectronic module and of the card body and is visible to the naked eye, the second security marking being produced in the structure of the card body and being invisible to the naked eye, but detectable by radiography.

2. The smart card as claimed in claim 1, wherein the security marking of the module is printed on or engraved in the surface of the microelectronic module, and wherein the security marking of the card body is printed on or engraved in an intermediate layer of the card body, and is visible through a transparent window provided in a layer of material covering said intermediate layer.

3. The smart card as claimed in claim 1, wherein the first security marking is placed straddling the microelectronic module and the card body, and comprises a portion produced on the microelectronic module and a portion produced on the card body, the entirety of the first security marking being reproduced substantially identically in at least one preset location on the card body.

4. The smart card as claimed in claim 1, wherein said security markings are composed of a sequence of alphanumeric characters.

5. The smart card as claimed in claim 4, wherein the alphanumeric characters are aligned in a straight line.

6. The smart card as claimed in claim 4, wherein the alphanumeric characters are aligned in two straight-line segments making a preset angle to each other.

7. The smart card as claimed in claim 1, wherein each portion of the first security marking corresponds to one portion of a digital code so that the two markings depend on each other via a secret coded relationship.

8. The smart card as claimed in claim 1, wherein the security markings comprise all or some of the serial number of the smart card, or of a code obtained by encrypting the serial number of the smart card.

9. The smart card as claimed in claim 1, wherein the portion of the security marking located on the microelectronic module is produced in an electrically insulating zone located between metalized contacts of the module in the case of a contact smart card, or between the metalized turns of the antenna of the module in the case of a contactless smart card.

10. The smart card as claimed in claim 1, provided with an antenna enabling radiofrequency communication with a remote reader, wherein the security marking of the card body is placed on the antenna or on an antenna carrier substrate.

11. The smart card as claimed in claim 1, wherein the security markings are encoded in digital form and stored in a memory of the smart card.

12. A smart card comprising:
a card body provided with a cavity in which is inserted an electronic module incorporating a microelectronic chip, and at least one security marking able to authenticate a component of the smart card, wherein the security marking comprises a first security marking distributed between the microelectronic module and the card body, and at least one second security marking placed on the card body, and wherein the first and the one or more second security markings are related by an identity relationship or visual complementarity indicating that the microelectronic module and the card body are original components assembled during manufacture of the smart card, wherein the two security markings are produced in the structure of the microelectronic module and in the structure of the card body and are invisible to the naked eye, but detectable by radiography.

13. The smart card as claimed in claim 12, wherein the first security marking is placed straddling the microelectronic module and the card body, and comprises a portion produced on the microelectronic module and a portion produced on the card body, the entirety of the first security marking being reproduced substantially identically in at least one preset location on the card body.

14. The smart card as claimed in claim 12, wherein said security markings are composed of a sequence of alphanumeric characters.

15. The smart card as claimed in claim 14, wherein the alphanumeric characters are aligned.

16. The smart card as claimed in claim 12, wherein each portion of the first security marking corresponds to one portion of a digital code so that the two markings depend on each other via a secret coded relationship.

17. The smart card as claimed in claim 12, wherein the security markings comprise all or some of the serial number of the smart card, or of a code obtained by encrypting the serial number of the smart card.

18. The smart card as claimed in claim 12, wherein the portion of the security marking located on the microelectronic module is produced in an electrically insulating zone located between metalized contacts of the module in the case of a contact smart card, or between the metalized turns of the antenna of the module in the case of a contactless smart card.

19. The smart card as claimed in claim 12, provided with an antenna enabling radiofrequency communication with a remote reader, wherein the security marking of the card body is placed on the antenna or on an antenna carrier substrate.

20. The smart card as claimed in claim 12, wherein the security markings are encoded in digital form and stored in a memory of the smart card.

* * * * *